United States Patent [19]

Lucich et al.

[11] Patent Number: 5,499,437
[45] Date of Patent: Mar. 19, 1996

[54] METHOD OF ASSEMBLING A MAINTENANCE FRIENDLY VARIABLE SPEED BELT DRIVE

[75] Inventors: Todd C. Lucich, Simpsonville, S.C.; Edward F. Krome, Jr., Columbus, Ind.; Michael G. Howe, Columbus, Ind.; Larry D. Fields, Columbus, Ind.; Joseph R. Mihelick, Simpsonville, S.C.

[73] Assignee: Reliance Electric Industrial Company, Greenville, S.C.

[21] Appl. No.: 45,896

[22] Filed: Apr. 12, 1993

Related U.S. Application Data

[62] Division of Ser. No. 798,912, Nov. 27, 1991, Pat. No. 5,236,395.

[51] Int. Cl.[6] ...................................................... B23P 19/04
[52] U.S. Cl. ................... 29/402.03; 29/402.08; 29/426.1; 29/434
[58] Field of Search .................. 29/402.03, 402.08, 29/426.1, 434

[56] References Cited

U.S. PATENT DOCUMENTS

| | | |
|---|---|---|
| 3,418,863 | 12/1968 | Landau . |
| 4,370,139 | 1/1983 | Zigler . |
| 4,384,863 | 5/1983 | Huff et al. . |
| 4,411,590 | 10/1983 | Meredith . |
| 4,425,102 | 1/1984 | Huff et al. . |
| 4,740,191 | 4/1988 | Takano et al. ........................ 474/69 |
| 4,770,065 | 9/1988 | Woyton . |
| 4,925,432 | 5/1990 | Miyamaru et al. .................... 474/69 |
| 4,946,424 | 8/1990 | Sakakibara et al. .................. 474/11 |

FOREIGN PATENT DOCUMENTS 2002469  2/1979  United Kingdom .

OTHER PUBLICATIONS

EPO Communication Regarding Supplementary Partial European Search Report, Sep. 15, 1994, With Attached Report Of Sep. 5, 1994 With Annex, For EP 92 92 5199(3 pages.).

Primary Examiner—David P. Bryant
Attorney, Agent, or Firm—Dority & Manning

[57] ABSTRACT

A method of assembling a variable speed belt drive of the type having a pair of shiftable discs received on respective input and output shafts with a drive belt entrained thereabout. Methodology of the invention includes providing a drive housing with a relatively large interior access opening. The drive housing has a support backbone at a generally central location in the interior access portion. The support bracket is mounted to the support backbone to straddle support the output shaft having a pair of variable speed discs mounted thereon. A singular one of a pair of constant speed discs is mounted on the input shaft. The drive belt is installed about the output shaft entrained in between the variable speed discs and with the loop of the drive belt placed about the input shaft. A second one of the constant speed discs is mounted onto the input shaft. A further step often included involves installing speed change means for adjusting the drive ratio between the respective pairs of discs so as to vary the drive power transmitted between the shafts via the drive belt. A housing cover may then be secured to the drive housing opening. The assembly steps may also be selectively reversed for maintenance and/or adjustment to the drive belt and other components within the drive housing.

7 Claims, 5 Drawing Sheets

METHOD OF ASSEMBLING A MAINTENANCE FRIENDLY VARIABLE SPEED BELT DRIVE

This is a division of application Ser. No. 07/798,912, filed Nov. 27, 1991, now U.S. Pat. No. 5,236,395.

BACKGROUND OF THE INVENTION

The present invention generally concerns an improved variable speed drive and more particularly concerns an improved, maintenance friendly mechanical adjustable variable speed belt drive and related methods.

One type of widely used mechanical adjustable drive is referred to generally as a variable speed belt drive, and includes a V-belt entrained about two pairs of relatively axially movable discs received on respective input and output shafts. In order to change the drive ratio between the two shafts, various mechanisms are used to change the spacing between discs of a respective pair and to otherwise cause the position of the V-belt to change relative the disc pairs and relative the two shafts. As is well known to those of ordinary skill in the art, such a type of variable speed belt drive permits constant speed input power applied to the input shaft to be changed into a controlled, i.e., selected, variable speed drive output at the output shaft.

It is quite common that most components of such prior art variable speed belt drives are protectively enclosed, such as in a housing or casing. Frequently the input shaft is mated with the drive shaft of a constant speed electric motor or the like, while the output shaft is coupled with a load to be driven. Both the load and motor are often times received on the same side of the drive housing or casing, which is typically referred to as C-flow drive. Often a mechanical or an electrical control is provided outside of the housing so as to be accessible by the user for adjusting disc spacing on the input shaft, and thereby controlling the output speed of the drive. Such drives are available in a wide variety of horsepower ratings and have numerous applications throughout a wide variety of industries.

The following U.S. Pat. Nos., the disclosures of which are fully incorporated herein by reference, are examples of the above-referenced type of variable speed belt drive.

| INVENTOR | U.S. PAT. NO. | ISSUE DATE |
| --- | --- | --- |
| WOYTON | 4,770,065 | SEP. 13, 1988 |
| HUFF ET AL. | 4,425,102 | JAN. 10, 1984 |
| MEREDITH | 4,411,590 | OCT. 25, 1983 |
| HUFF ET AL. | 4,384,863 | MAY 24, 1983 |
| ZIGLER | 4,370,139 | JAN. 25, 1983 |
| LANDAU | 3,418,863 | DEC. 31, 1968 |

It is true for virtually every type of drive, conveyor means, or other industrial piece of equipment, that routine maintenance is an absolute necessity. Because of such, it is highly desirable that routine maintenance procedures be streamlined for their efficient execution, safety, and effectiveness. In addition, the time element involved can be quite critical since drives in commercial installations are often times critical to operation of a production line or a manufacturing process.

Performance of any significant maintenance procedures on an enclosed variable speed belt drive almost always requires maintenance personnel to enter, i.e., open, the drive housing or casing. For example, two of the most common maintenance items for a variable speed belt drive involve: (1) changing the drive belt and (2) servicing the sliding disc member of the input shaft. The latter item often takes the form of replacing one or more bushings associated with the outboard or distal disc of the constant speed disc pair. In most arrangements of such a type of drive, it is typically the outboard side disc on the input shaft which slides or moves relative its paired disc, while it is the inboard disc of the disc pair received on the output shaft which is shifted during speed changing, i.e., variation of the drive ratio. Of course, wear to such bushings and/or the drive belt itself occurs simply as a result of the normal operation of a properly functioning variable speed belt drive.

Many prior art variable speed belt drives use a removable housing portion or cover as a load bearing support and/or for alignment functions. More specifically, it is typical that the housing cover provides load bearing support such as receipt of bearing means or the like for rotatably supporting an end or axial portion of a shaft, such as the output shaft.

Generally speaking, any time structural support is provided for bearings which rotatably support a shaft, such structural support also is important with respect to alignment of the bearings supported thereby, and hence, important to the rotational alignment of the supported shaft. As another general proposition, it is not desirable to have to remove support for an aligned shaft since to do so can give rise to shaft misalignment, which ill many cases results in increased and excessive wear, and in worst cases can result in shaft or drive failure. Other various difficulties and drawbacks arising due to misalignment of a rotating load bearing shaft are well known in industry.

In order to lessen difficulties with removing such a housing cover, some prior art devices attempt to support the output shaft and the pair of variable speed discs supported thereon by one or more bearings on a single, i.e., inner, side of the shaft. In other words, a cantilevered support arrangement is provided for the outboard or distal end of the output shaft, to eliminate housing support at such point.

However, it is widely practiced that disc shifting (i.e., spacing changes) on an output shaft of a variable speed belt drive is achieved through a spring biased mechanism or similar so that the disc spacing on the output shaft actually follows changes thereto dictated by relative movement of the drive belt in accordance with positive displacements of the constant speed discs received on the input shaft. The net effect is that installation of a drive belt generally requires a significant amount of force or effort (and sometimes involves jerking, pulling, or similar forces) in order to adequately separate the discs received on the output shaft to permit insertion of the drive belt therebetween. In other words, some degree of force is necessarily imparted to the output shaft in the region of the discs mounted thereon, as the spring biasing is overcome to separate such discs.

A cantilevered support arrangement for an output shaft does not lend itself to providing adequate rigidity during the above-referenced belt changing operations in order to avoid misalignment or other damage to the output shaft and/or other components. Such is a significant problem since replacing damaged or worn drive belts, as noted above, is one of the most frequent maintenance procedures. It is also significant from the perspective that drive belts can be readily removed, e.g., cut off, or the like, and the real problem only occurs during reinstallation, where the forces described above come into play. Of course, lateral (i.e., misaligning) forces are applied to the output shaft during its normal operations, and such could act adversely on an inadequately supported shaft.

Those of ordinary skill in the art will also understand that attempting to work with such prior art drives in such a manner as to eliminate excessive forces to force-sensitive components would only add time to an already time consuming procedure.

Another approach to minimizing removable housing cover problems is to provide a split cover arrangement, wherein two or more separately removable covers are used to cover openings at each of the respective input and output shafts, and possibly other areas. However, such an approach does not necessarily eliminate the bearing support and shaft alignment problems discussed above. Moreover, such an approach, in fact, adds to the multiplicity of separate parts often present in variable speed drives, and which must be handled during maintenance procedures. In fact, the positioning and location of certain drive installations, such as overhead, or otherwise in elevated areas, can make even the simple job of handling loose parts without loss a significant operation.

In addition, relatively large number of parts results in higher costs, particularly as the number of machined surfaces increase. Also, weight can be a factor where relatively massive, for example, cast iron, component pieces are needed in order to bolster or render adequate the rigidity of various designs. Such is frequently the case where the housing cover itself must be strong enough to be utilized for load bearing and alignment functions.

Another aspect of the foregoing problems relates to the features or components utilized in actuating speed change. It is often times in this area that the most number of parts are encountered, as well as greatest complexity of individual parts and their interconnections. The added number and complexity of the parts in such area relative other parts only adds to all of the above-referenced difficulties. Also, relative unfamiliarity of maintenance personnel when dealing with smaller parts which must fit together with precision, is again a tremendous source of time consumption and other costs.

Still further, typical prior art variable speed belt drives incorporate their various actuation features into and/or associated with the input shaft. Yet, it is the sliding or movable disc of the constant speed disc pair received on the input shaft which has bushings which are one of the most frequent wear, i.e., maintenance, problems in the variable speed drive. Accordingly, maintenance personnel are frequently called on to disassemble and reassemble actuation mechanisms associated with the input shaft simply to permit the performance of maintenance procedures to the outboard disc of the constant speed disc pair. Similarly, such outboard constant speed disc often must be removed in order to permit reinstallation of a new drive belt.

SUMMARY OF THE INVENTION

The present invention recognizes and addresses various of the foregoing problems, and others, concerning variable speed drives, particularly variable speed belt drives and related maintenance methods thereof. Thus, broadly speaking, a principal object of this invention is improved belt drives and corresponding maintenance methods thereof. More particularly, a main concern is improved design and maintenance of mechanical adjustable variable speed belt drives.

It is another general object of the present invention to provide both apparatus and method relating to a maintenance friendly variable speed belt drive. It is a more particular object to provide such an improved belt drive which is easier to disassemble and assemble, and hence, easier to maintain.

It is therefore another particular object of the present invention to provide a belt drive which may undergo maintenance operations in vastly reduced periods of time as compared with maintenance times for prior designs. For example, it is a present object to permit greatly improved access to the drive belt, disc bushings, and other components which require relatively frequent maintenance attention.

It is a still further object to generally eliminate the disadvantages associated with using a removable housing cover as a load bearing component of a belt drive, such as for supporting and aligning bearings to support a shaft. A present object is to provide a design which permits use of a nonload bearing housing cover, and which results in improved maintenance times.

It is a still further object to greatly simplify the construction of variable speed belt drives so as to not only greatly reduce maintenance time thereof, but to significantly reduce the number, as well as weight of component parts. In conjunction with such object, it is also a present object to reduce manufacturing costs by minimizing the number of components with machined surfaces.

While pursuing the object of providing a removable housing cover which is generally nonload bearing, it is desired to still provide adequately rigid and stable shaft support so that, for example, the output shaft remains undamaged during normal drive belt installation procedures.

Another more particular object is to provide such an improved variable speed belt drive which contains structural components which perform multiple functions, and thereby contribute to the elimination or reduction in number of components. For example, it is one present object to provide an improved support bracket for use with a variable speed belt drive. It is a more particular object to provide a relatively centralized such improved support bracket for cooperating with a support backbone of a housing, to provide structural support for the outboard side of the output shaft while also supporting at least a portion of the variable speed control mechanism.

Yet another present object is an improved speed changing mechanism, particularly for a variable speed belt drive.

It is a still further present object to provide adjustable stop means in association with a unique, pivot mounted shifting yoke and associated shifting screw and shifting nut, to further simplify actuation of variable speed control and the setting of speed limits thereof.

It is a further object to provide the foregoing improved variable speed drive adapted, such as with an output mounting flange, so as to facilitate its use and incorporation with other components such as a gear speed reducer.

It is another present general object to provide improved maintenance methods based on presently disclosed improved variable speed drives such as incorporating advantageous features thereof, such as a straddle mounted output shaft and/or a removable nonload bearing housing cover.

Particularly in conjunction with the present improved methodologies, it is a further object to provide means for simplified alignment of discs, both on the input shaft as well as the output shaft of the variable speed belt drive. It is a more particular object to make use of the housing itself to define an alignment edge by which one of the disc members on the input shaft may be aligned. At the same time, it is an object to provide simplified and relatively automatic alignment of the discs on the output shaft by virtue of the positioning thereof upon use of the present backbone and bracket combination.

Additional objects and advantages of the invention are set forth in, or will be apparent to those of ordinary skill in the art from, the detailed description which follows. Also, it should be further appreciated that modifications and variations to the specifically illustrated and discussed features and steps hereof may be practiced in various embodiments and uses of this invention without departing from the spirit and scope thereof, by virtue of present reference thereto. Such variations may include, but are not limited to, substitution of equivalent means and features, materials or steps for those shown or discussed, and the functional or positional reversal of various parts, features, steps, or the like.

Still further, it is to be understood that different embodiments, as well as different presently preferred embodiments, of this invention may include various combinations or configurations of presently disclosed features or steps, or their equivalents (including combinations or configurations of features or steps thereof not expressly shown in the figures or stated in the detailed description).

One exemplary such embodiment of the present invention relates to a belt drive, comprising a pair of constant speed discs mounted on a first shaft for receiving a constant speed drive input; a pair of variable speed discs mounted on a second shaft for providing a variable speed drive output; a drive belt received about the first and second shafts and in between the respective disc pairs for transmitting drive power therebetween; speed change means for adjusting the drive ratio between the respective disc pairs so as to vary the drive power transmitted between the shafts via the drive belt; and support means for supporting at least one of the shafts on an axial side of the belt drive to which access is provided for belt changing. Such support means preferably extends through the loop of the drive belt so that the drive belt may be removed and replaced without disturbing the support for such at least one shaft.

Another present exemplary embodiment concerns a mechanically adjustable variable speed belt drive, comprising a pair of constant speed discs mounted on a controllably shiftable first shaft for changing the spacing between the constant speed discs; and speed control means for controllably shifting the first shaft.

Such drive also further includes a pair of variable speed discs mounted on a second shaft relatively displaced from and generally parallel to the first shaft, the second shaft extending axially on either side of the variable speed discs and having first and second support regions on respective sides of the variable speed discs; and drive belt means received about the first and second shafts and in between the respective disc pairs for transmitting drive power therebetween.

Still further, the foregoing drive preferably includes second shaft shifting means for adjusting the relative distance between the variable speed discs to follow constant speed disc spacing changes caused by operation of the speed control means; and second shaft support means for supporting the first support region of the second shaft on one side of the variable speed discs and extending in between the first and second shafts, through the loop of the drive belt, and onto the opposite side of the variable speed discs for supporting the second support region of the second shaft. With such an arrangement the drive belt may be replaced from such opposite side without disengaging support for the second shaft.

Yet another construction comprising a present exemplary embodiment includes an enclosed variable speed belt drive with improved access to internal components thereof for maintenance. Such a belt drive includes housing means for enclosing components of the belt drive, and including an interior chamber for receipt of internal components; a support backbone therein for support of at least one component received in the interior chamber; an opening defined by the housing means for entrance to the interior chamber thereof; and a removable, nonload bearing housing cover generally mated with such opening of the housing means, for providing relatively exposed access to the interior chamber through such opening whenever the cover is removed therefrom.

Such a drive as above would preferably further comprise closure means for removably securing the housing cover to said housing means generally mated with the opening thereof; respective pairs of discs comprising variable pitch sheaves on respective input and output shafts, received in the housing means interior chamber; a drive belt entrained about such shafts and in between the disc pairs for transmitting drive power between the shafts; and means for changing the drive ratio between the shafts by adjusting the drive relationship between the discs and the belt.

Further, more particularly concerning other support features of such an embodiment, such a drive would preferably include a pair of bearing means for supporting the output shaft on respective sides of the disc pair associated therewith; means for supporting one of the output shaft bearing means generally on one side of the housing means; and bracket means, extending from the support backbone and through the loop of the drive belt, for supporting the other of the output shaft bearing means generally on a side of the housing means opposite to such one side thereof.

With the foregoing arrangement, the output shaft is straddle supported without requiring load bearing support from the housing cover, thereby improving access to the interior chamber, the input shaft, and the disc pair associated therewith for maintenance procedures upon removal of the cover.

Those of ordinary skill in the art will appreciate from the present disclosure that the subject invention also addresses various improved maintenance methods. Included therein are methods of assembling and (at least partially) disassembling a maintenance friendly belt drive, such as drives described herewith. One present exemplary method of assembling and subsequently maintaining a maintenance friendly belt drive comprises:

providing a drive housing with a relatively large interior access opening thereto and having relatively central therein a support backbone, a first shaft supported on its proximal end by the housing on one side of such backbone and adapted for receiving a constant speed drive input, and a second shaft supported on its proximal end by such housing on the other side of the backbone and adapted for providing a variable speed drive output, such second shaft having a pair of variable speed discs mounted thereon;

securing a support bracket to the support backbone, so that such bracket engages and rotatably supports a distal end of the second shaft;

providing a pair of constant speed discs, and mounting the proximal one of such discs on the first shaft;

installing a drive belt about the second shaft entrained in between the variable speed discs and with the loop of such drive belt placed about the first shaft;

mounting the distal one of the constant speed discs onto the first shaft;

installing speed change means for adjusting the drive ratio between the respective discs pairs so as to vary the drive power transmitted between the shafts via the drive belt, including mounting a thrust bearing over the distal end of the first shaft, with such thrust bearing supported for axial movement thereof along such first shaft by operation of an actuation mechanism associated therewith; and securing a housing cover to such drive housing opening.

As referenced above, present methods of this invention include selectively reversing the foregoing assembly steps (and others) for maintenance and/or adjustment to the drive belt, disc bushings, and other components within the drive housing.

It is also to be understood that various present embodiments more particularly separately concern certain improved components or features as contribute to the presently improved variable speed belt drive and related methods. One example thereof relates to an improved support bracket for use with a variable speed belt drive of the type having a pair of constant speed discs mounted on a first shaft, a pair of variable speed discs mounted on a second shaft, a drive belt entrained about such shafts and in between the pairs of discs, speed changing means for changing the drive ratio between the shafts, and a main body supporting at least one end of each of the shafts. More specifically, such an improved support bracket in accordance with this invention includes a first support arm adapted for securement to the belt drive main body projecting through the loop of the drive belt thereof; a second support arm supported on the first support arm and projecting therefrom into a position adjacent a distal, unsupported end of the second shaft; and means carried on the second support arm for rotatably receiving the second shaft distal end, so that the second shaft is straddle supported for removal of the drive belt without disturbing the support of the second shaft.

It is still further to be understood that other present embodiments relate to such separately improved features and components in combination with a variable speed belt drive. For example, one such embodiment relates to a variable speed belt drive with an improved speed changing mechanism, comprising a pair of constant speed discs mounted on a controllably shiftable first shaft for changing the spacing between the constant speed discs; a pair of variable speed discs mounted on a second shaft; a drive belt entrained about the shafts and in between such pairs of discs for transmitting drive power between such shafts; a main body supporting at least one end of each of the shafts; a support mount received on the main body on one side of the first shaft; axial actuation means and associated actuation element, received on the main body on a side of the first shaft generally opposite to the support mount, for controlled axial displacement therealong of the actuation element thereof; thrust bearing means carried on the first shaft axially on the distal side thereof relative the constant speed discs; and shifting yoke means, pivotably supported on the support mount and operatively engaged with the thrust bearing means and the actuation element, for axially moving the thrust bearing means relative the first shaft responsive to axial displacement of the actuation element by operation of the axial actuation means, so that a resulting change is made in the drive ratio between the first and second shafts.

Those of ordinary skill in the art will better appreciate the features and aspects of such embodiments and methods, and others, upon review of the remainder of the specification.

BRIEF DESCRIPTION OF THE DRAWINGS

A full and enabling disclosure of the present invention, including the best mode thereof, directed to one of ordinary skill in/the art, is set forth in the remainder of the specification, which makes reference to the appended Figures, in which.

Repeat use of reference characters throughout the present specification, and appended drawings is intended to present same or analogous features, elements, or steps of the invention.

DETAILED DESCRIPTION OF THE PREFERRED EMBODIMENTS

Those of ordinary skill in the art will appreciate that the following description is both for purposes of describing the invention generally and for specifically describing the presently illustrated exemplary embodiments. Accordingly, the present invention encompasses modifications, variations, and equivalents to these embodiments, as more broadly come within the spirit and scope of the invention, as hereinafter described.

Figures 1, 2:
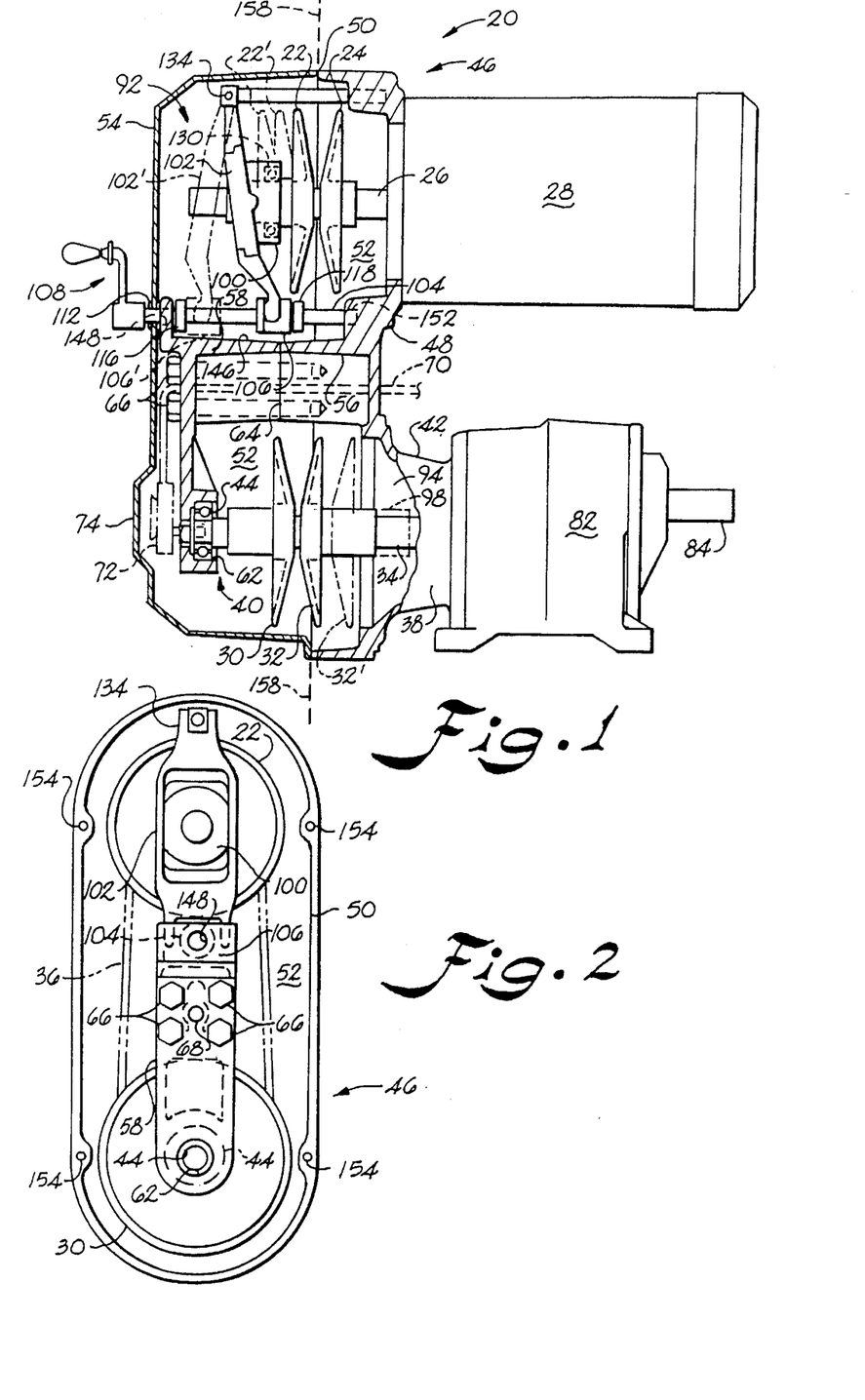
FIG. 1 is a side elevational view, with partial cutaway and cross sectional illustrations, of a first exemplary embodiment of the present invention, illustrating use thereof with a conventional constant speed electric motor and a conventional gear speed reducer.
FIG. 2 is an end elevational view (housing cover removed) of the exemplary embodiment represented in present FIG. 1.
Figure 3:
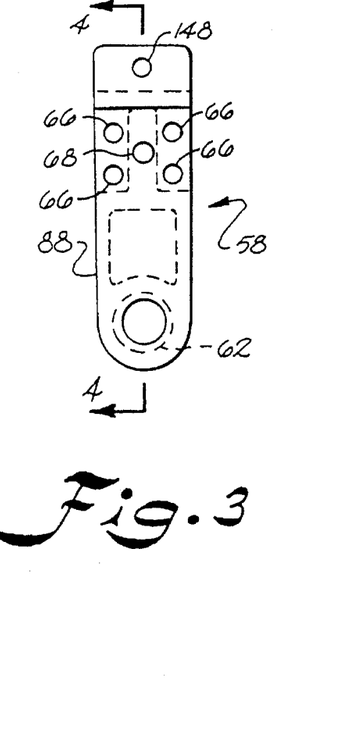
FIG. 3 is an end elevational view, with partial representation in dotted line of certain features, of an exemplary support bracket in accordance with the present invention, and is represented in the exemplary embodiment of present FIG. 1.
Figure 4:
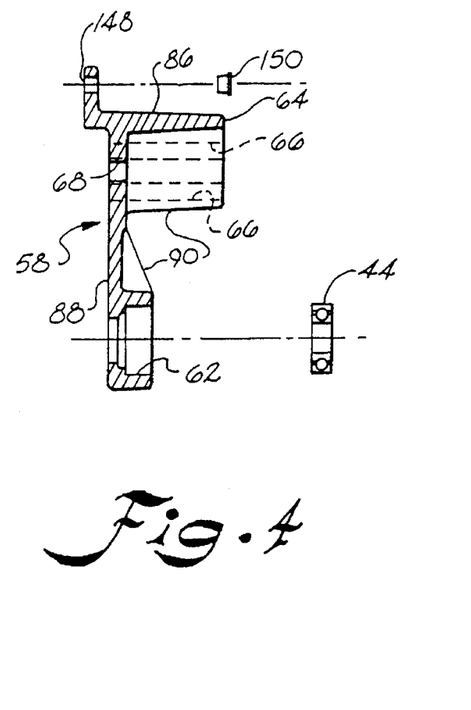
FIG. 4 is a cross sectional view of the FIG. 3 support bracket embodiment, taken along the section line 4—4 in such FIG. 3.
Figures 5, 6:
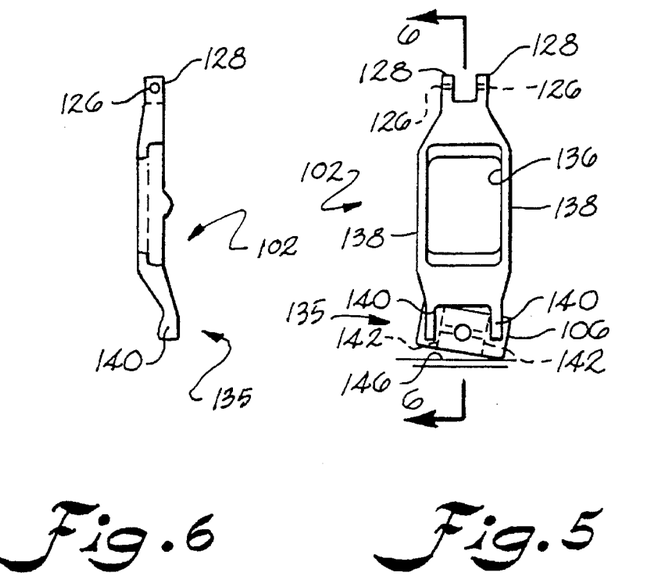
FIG. 5 is an end elevational view, with partial representation in dotted line of certain features, of an exemplary shifting yoke in accordance with the present invention, and as represented in the exemplary embodiment of present FIG. 1.
FIG. 6 is a cross sectional view of the FIG. 5 shifting yoke embodiment, taken along the section line 6—6 in such FIG. 5.
Figure 7:
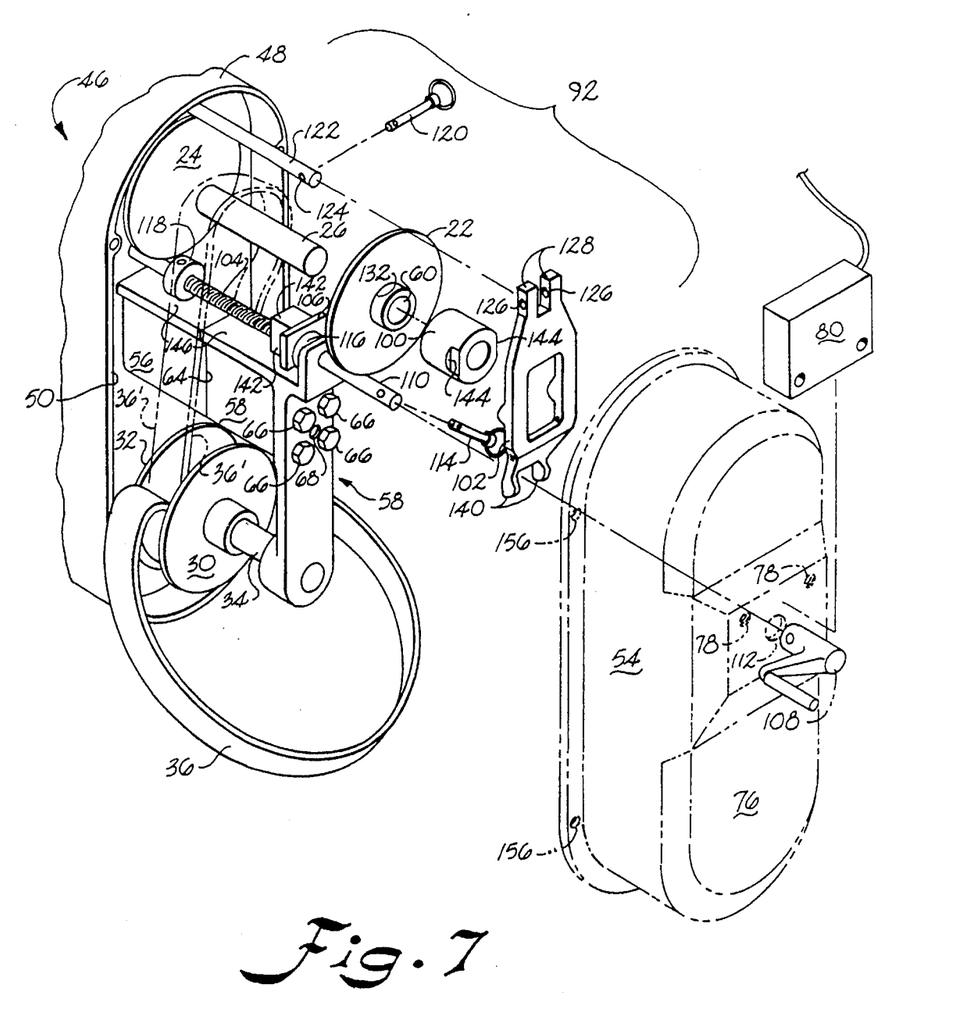
FIG. 7 is a relatively side, relatively top perspective view of the exemplary embodiment of FIG. 1, in partially exploded illustration to facilitate discussion of associated assembly and (partial) disassembly and related maintenance methods in accordance with this invention.

FIG. 1 is a generally side elevational view, in partial cutaway and cross section, of a first embodiment of an exemplary belt drive 20 in accordance with this invention. FIG. 2 is generally an end elevational view of such belt drive 20, with a housing cover thereof removed. FIGS. 3 and 4 are end elevational and cross sectional views, respectively, of support bracket features of the FIG. 1 embodiment, with the FIG. 4 cross section being taken along line 4—4 of FIG. 3. FIGS. 5 and 6 are a front elevational and cross sectional view, respectively, of shifting yoke features in accordance with the FIG. 1 exemplary embodiment, with the FIG. 6 cross section being taken along line 6—6 of FIG. 5. FIG. 7 is an enlarged and partially exploded relatively top and side perspective view of the FIG. 1 embodiment, which will be discussed in greater detail below with reference to present methodologies.

Belt drive 20 includes a pair of constant speed discs 22 and 24 which comprise variable pitch sheaves, axially shiftably mounted on a first shaft 26 for receiving a constant speed drive input, as understood by those of ordinary skill in the art. For example, first shaft or input shaft 26 may be controllably shiftable for changing the spacing between constant speed discs 22 and 24 with the distal or outboard side disc 22 being the shifted or movable disc, as represented by the dotted line partial disc representations 22' in FIG. 1. The proximal or inboard disc 24 is generally axially fixed during drive operations.

A constant speed drive input may be provided to shaft 26 from a constant speed electric motor 28 or the like, which may be removably coupled or otherwise associated with belt drive 20. Specifics of such constant speed electric motor 28 are well known to those of ordinary skill in the art and form no particular aspects of the subject invention.

Belt drive 20 has another pair of discs 30 and 32 mounted on a second or output shaft 34 for providing a variable speed drive output. Second shaft 34 is relatively displaced from and generally parallel to first shaft 26, as represented in present FIGS. 1, 2, and 7. As also represented therein, such shaft is straddle supported in accordance with the subject invention, i.e., supported, such as in bearings, on either side of the load applied thereto. As understood by those of ordinary skill in the art, such load is applied by a drive belt 36 (FIGS. 2 and 7) which is entrained about shafts 26 and 34 and in between the respective pairs of discs.

More specifically, second shaft 34 extends axially on either side of variable speed discs 30 and 32 and provides adequate axial space for movement of variable speed disc 32 to complement movement (i.e., axial shifting) of constant speed disc 22. See the alternate position of disc 32 referenced in FIG. 1 as 32' and shown in dotted line. As with disc 24, disc 30 is generally axially fixed during drive operations. Of course, the present invention is equally applicable to alternate embodiments wherein the axially fixed and movable functions within disc pairs are reversed from those shown and discussed (e.g., with discs 24 and 30 axially movable and discs 22 and 32 axially fixed during drive operations).

Figure 8:
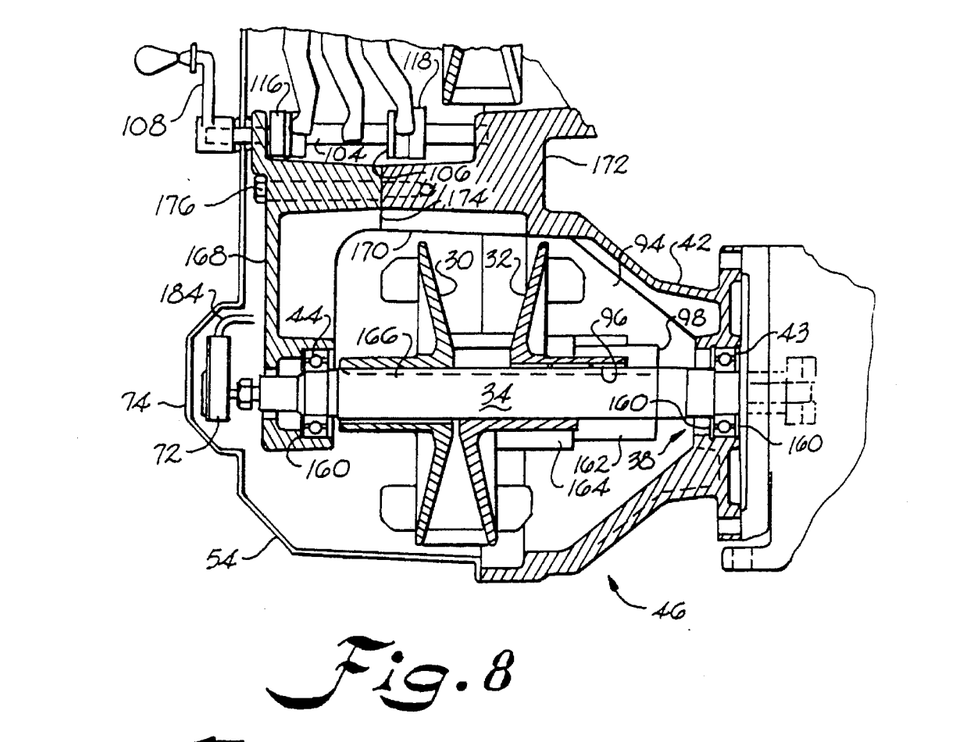
FIG. 8 is an enlarged and partial view of a cross section of a second exemplary embodiment of an improved variable speed belt drive in accordance with the subject invention, primarily focused on the area of the output shaft and support bracket and associated features thereof.

Further in accordance with the present invention, shaft 34 has respective first and second support regions generally 38 and 40 situated on respective sides of the variable speed discs 30 and 32. First support region does not directly appear in FIG. 1 because it is situated beneath the extended integral mounting flange 42, but it is preferably adjacent the point where shaft 34 exits belt drive 20. FIG. 8 shows in greater detail such a first support region 38 and the first bearing means 43 preferably associated therewith.

With reference again to FIG. 1, a further, i.e., second, set of bearing means 44 are received for rotatably supporting the second support region 40 of second shaft 34. In such manner, output shaft 34 is advantageously supported in a straddled configuration, without requiring support from a housing cover, in accordance with the subject invention, as discussed in greater detail hereinafter.

Without further discussion, those of ordinary skill in the art will appreciate that drive belt means 36, for example, a single loop, flexible V-belt, is received about first shaft 26 and second shaft 34 and in between the respective disc pairs 22/24 and 30/32 thereof for transmitting drive power therebetween. Specifics of such operations are discussed in greater detail above, wherein the above-listed six U.S. patents are fully incorporated by reference with respect to all disclosure pertaining to such operations, and all other disclosure thereof.

In accordance with the present invention, belt drive 20 may include housing means, generally 46, for enclosing such belt drive. Such housing means or drive housing may include a support backbone or basic casing 48 which defines an opening 50 to the interior 52 thereof. Such opening 50 is actually defined by the peripheral edge of the housing means 46.

As further represented in FIGS. 1 and 7, housing means 46 has a removable housing cover 54 which may be fitted or mated to opening 50. Removing the housing cover selectively provides access to the interior components of the belt drive for maintenance and adjustment thereof. As illustrated, practice of the present invention results in tremendous exposure of and access to the drive belt interior components. As further represented primarily in present FIG. 1, the interior 52 of housing means 46 includes the regions enclosed by securement of removable housing cover 54. As represented in both FIGS. 1 and 7, such cover 54 is generally of a concave nature, with the concavity thereof forming a substantial portion of the interior 52 of housing means 46. Other cover shapes may be practiced.

As also represented in present FIGS. 1 and 7, removable housing cover 54 is generally nonload bearing, particularly with respect to support of shafts 26 and 34. Use of the terminology "nonload bearing" for this invention does not exclude the incidental mounting of various relatively lightweight components on housing cover 54. Such components may include nameplates, safety information, or even electronic control modules and the like for electrical remote control actuation mechanisms as discussed below (see also FIG. 7).

The following more particularly concerns various support features of the present invention which advantageously permit the use of a relatively nonload bearing removable housing cover, and other present advantageous features providing an improved maintenance friendly variable speed belt drive.

As represented in present FIGS. 1 and 7, support backbone 48 and other features of housing means 46 cooperate so as to support second shaft 34 in the desired straddle support arrangement. For example, support backbone 48 includes a relatively projected member or region 56 which is directed towards the relative outboard side of housing means 46. Such region 56 is generally in between the first shaft 26 and second shaft 34. Moreover, a support means or support bracket 58 is cooperative therewith so as to extend through the loop of drive belt 36.

As represented particularly in present FIGS. 1, 2, and 7, support bracket 58 extends onto the opposite side (i.e., outboard side) of the variable speed discs 30 and 32 for supporting the second support region 40 of second shaft 34. In such manner, the drive belt 36 may be replaced from such opposite side (i.e., outboard side) of housing means 46 without disengaging support of the second shaft 34. Such features advantageously eliminate the potential for introducing misalignment to such shaft 34, or other undesired occurrences, simply during the course of conducting necessary maintenance and/or adjustment procedures where access to the output shaft itself is not required.

As discussed in greater detail below, support bracket 58 also may advantageously remain in place during performance of other routine maintenance operations other than changing the drive belt. For example, as referenced in present FIG. 7, bushings, e.g., disposable plastic rings (not shown), may be received at different axial locations within central annular opening 60 of sliding disc 22 of the constant speed disc pair. As understood by those of ordinary skill in the art, wear occurs as such disc slides relative shaft 26, which is received through such annular opening 60 thereof.

The illustrated combination in FIGS. 1 and 7 of support bracket 58 and region 56 of support backbone 48 may be thought of as comprising second shaft support means for supporting the first support region 38 of the second shaft 34 (see the discussion referring to integral flange 42 as forming part of housing means 46 and the discussion with respect to first bearing means 43, FIG. 8). As represented, the first support region 38 is on one side of the variable speed discs. The collective second shaft support means so defined also extends in between the first and second shafts 26 and 34, through the loop of the drive belt 36, and onto the opposite side of the variable speed discs, as illustrated, for supporting the second support region 40 of such second shaft 34. Such support preferably includes provision of an annular region 62 in which second bearing means 44 are received.

As will be understood by those of ordinary skill in the art, one of the possible variations in accordance with the spirit and scope of the present invention involves changes to the exact placement of the dividing line 64 as between such components 56 and 58. As discussed below in conjunction with some of the illustrated alternate embodiments, such dividing line may be "moved." In other words, projected region 56 may be shorter, longer, or may not exist, in which case support bracket 58 would extend rearwardly (.i.e., to the right in FIG. 1) until reaching support backbone 48 for securement thereto. As represented, a plurality of bolt means 66 or their equivalents may be used to removably secure support bracket 58 to support backbone 48. Four threaded bolt arrangements 66 are illustrated in present FIGS. 1, 2, and 7. However, the number of such components may be varied depending on specific embodiments, and as further represented in alternate embodiments illustrated herewith, such as in FIGS. 9 through 13, discussed below.

Another alternative feature which may be selectively practiced, as desired, is the inclusion of a longitudinal channel 68 in support bracket 58. Such longitudinal channel may receive electrical signal wires 70 (shown in dotted line in FIG. 1), such as from a tachometer pickup 72 (shown in dotted line in FIG. 1) associated with the variable speed output of output shaft 34. As illustrated in such FIG. 1, tachometer means 72 may be directly interconnected into an end of shaft 34 adjacent second support region 40 thereof. In the event such a tachometer pickup is to be utilized, housing cover 54 may be modified, if desired, such as with an extended area 74 to facilitate inclusion of the tachometer pickup. As alternatively illustrated in present FIG. 7, such area 76 of housing cover 54 need not be so specifically modified, if the housing cover is otherwise adequately large or if use of a tachometer pickup is not desired.

Similarly, users may make various modifications and variations to housing cover 54 without departing from the spirit and scope of the present invention, so as to accommodate use of other optional features. For example, housing cover 54 may be further provided with openings 78 (FIG. 7) or the like by which an electronic remote control 80 may be secured thereto. In such event, electrical control wires or the like may be passed through longitudinal channel 68 in the alternative to, or in addition to, tachometer signal wires 70 receivable therein. Particular details of such electronic remote control 80 are well known to those of ordinary skill in the art, and form no particular features of the subject invention.

Choice of the form of speed control actuation is largely up to the discretion of the user, and often times will be influenced by the nature of the load or process to be driven by the belt drive 20. In the exemplary configuration of present FIG. 1, an integral output flange 42 has been formed as part of housing means 46, and is particularly adapted for receipt of a gear speed reducer 82, details of which form no particular aspects of the subject invention and which are well known to those of ordinary skill in the art. Alternate outputs may be practiced. For example, no flange 42 whatsoever might be used in given embodiments, with simply an output shaft 34 emerging from housing means 46 for operative engagement with an intended load. Such output shaft may be formed with an integral key, an integral keyway, or with a splined shaft to facilitate coupling to the intended load. In the particular embodiment illustrated, such output shaft 34 preferably actually comprises the input pinion to reducer 82, the output shaft 84 of which then drives the ultimate load for a drive conveyor manufacturing process, etc.

Since housing cover 54 is not required to carry any particular load (or at least no significant load), materials of which it is made may comprise fiberglass, plastic, sheet metal, or other similar relatively light-weight materials. Even a plastic or fiberglass construction would be adequate to support the exemplary electronic control device 80 of present FIG. 7, and would not depart from the spirit and scope of the present invention to the extent various features thereof involve a "nonload bearing" housing cover.

FIGS. 3 and 4 illustrate an end elevational and cross sectional view, respectively, of the exemplary support bracket 58 of present FIGS. 1, 2, and 7. In general, such improved support bracket includes a first support arm 86 adapted for securement to the belt drive main body or support backbone 48 and projecting through the loop of the drive belt 36 thereof, as illustrated in other figures. A second support arm 88 is supported on first support arm 86 and projects therefrom into a position adjacent the distal, otherwise unsupported, end 40 of the second shaft 34. The annular opening 62 receives a bearing arrangement or second bearing means 44 therein, within which second shaft 34 is rotatably received, as described above. Such means for rotatably receiving the second shaft distal end 40 may comprise components other than bearing means 44.

As shown primarily in FIGS. 1, 3, 4, and 7, various reinforcing flanges 90 may be used to interconnect between the first and second support arms 86 and 88, or to otherwise reinforce the support bracket 58. A preferred relative thickness and location of such members are further presented by the below surface, dotted line representations of FIG. 3. Another manner of increasing the rigidity of, i.e., reinforcing, support bracket 58 of FIGS. 3 and 4 is to form the first support arm 86 integrally with second support arm 88, as represented in the present figures. In some embodiments, it may also be possible to make use of separate elements which are joined together. Preferably, arms 86 and 88 are integrally formed from a relatively rigid material such as cast iron.

More broadly, the support bracket 58 of the subject invention may be thought of as having a first support arm 86 which comprises two separate elements removably joined to one another, one of which elements comprise part of the backbone support 48 integrally formed with the belt drive main body or housing means 46. Region 56 is an example of such a portion of the backbone which may be regarded as comprising a portion of the first arm of support bracket 58 in accordance with the subject invention. In such instance, the integrally formed portion of the backbone support actually comprises a projection which protrudes from the remainder of the belt drive main body 46 in a generally central position of the loop of the drive belt 36. When such a relatively central location is utilized, first and second arms 86 and 88 generally are at respective right angles to one another, as illustrated.

As illustrated in present FIGS. 1, 2, and 7, such embodiment of a belt drive 20 in accordance with the present invention further includes speed change means, generally 92, for adjusting the drive ratio between the respective disc pairs 22/24 and 30/32 so as to vary the drive power transmitted between shafts 26 and 34 via drive belt 36. As discussed above, first shaft 26 is controllably shiftable for changing the spacing between discs 22 and 24, as represented by the dotted line illustration of disc placements 22'. Speed control means of the subject invention for controllably shifting such first shaft will be discussed in greater detail below.

Changing the drive ratio also involves second shaft shifting means, generally 94 (FIGS. 1 and 8) for adjusting the relative distance between the variable speed discs 30 and 32 (see also disc placement 32') in order to follow spacing changes between the constant speed discs as caused by operation of the speed control means therefor. As understood by those of ordinary skill in the art, a biasing spring means 96 (FIG. 8) may be received in a cylindrical covering 98 or the like for biasing the movable variable speed disc 32 towards its paired disc 30, i.e., in an outboard direction towards support region 40 of second shaft 34. Variations thereto may be practiced.

The improved speed changing mechanism presently represented comprises specific aspects of certain embodiments of the subject invention. More specifically, with reference to present FIGS. 1, 2, and 7, the present speed change means in accordance with this invention includes a thrust bearing 100 received on the distal end of first shaft 26, a pivot mounted shifting yoke 102 associated with such thrust bearing 100 for moving same axially along the first shaft 26, and a shifting screw 104 and associated shifting nut 106 threaded thereto for pivoting the shifting yoke 100.

A mechanical device, such as a handwheel 108 may be used to selectively drive such shifting screw for changing the speed of belt drive 20 as described further below. As also represented in present FIG. 7, such handwheel 108 may assume different sizes or shapes (compare with FIG. 1).

Also, such handwheel may be secured to an extended portion 110 of shifting screw 104, which extended portion passes through an opening 112 formed in housing cover 54 (see FIGS. 1 and 7). Various attachment means may be utilized, such as a removable pin 114 with a ring handle and detent end for preventing such pin from falling out accidentally. Extended portion 110 of shifting screw 104 includes an opening (unlabeled) for such pin, which corresponds with a like opening (unlabeled) in the base of handle 108 (see FIG. 7).

As represented in such FIG. 7, handwheel 108 may be replaced with an electrical device or electrical control device 80, as also discussed above.

The speed control means of the subject invention may also include upper and lower speed limiting means for selecting upper and lower limits for the range of drive ratio settings of the speed change means. Preferably such comprise adjustable collars 116 and 118, which may be positioned along shifting screw 104 and locked thereto in desired positions, such as with a set screw or the like. As will be understood by those of ordinary skill in the art, the axial position of such locking collars 116 and 118 literally limit the extent of travel of shifting nut 106, thereby consequently limiting the range of drive ratio settings with such speed change means.

To facilitate initial mounting and removability of shifting yoke 102, an additional removable pin 120, with ring handle and detent end may be used in conjunction with a support mount 122, and with corresponding openings 124 in such support mount for receiving pin 120 and with like openings 126 in ears 128 of shifting yoke 102. FIGS. 5 and 6 illustrate end elevational and cross sectional views of such shifting yoke 102 and will be discussed in greater detail below.

Such shifting screw and associated shifting nut may in accordance with this invention be thought of more broadly as comprising axial actuation means and an associated actuation element. With such perspective, those of ordinary skill in the art will appreciate that support mount 122 is received on the drive housing 46 on one side relative to first shaft 26, while such axial actuation means or shifting screw 104 is received on a side of first shaft 26 generally opposite that to the side on which support mount 122 is received. With such an arrangement, the shifting yoke 102 in effect straddles or bridges over the distal end of shaft 26 where thrust bearing 100 is received. Bearing means 130 (FIG. 1) are actually carried within such thrust bearing 100 so that an extended flange 132 of disc 22 may be received thereagainst.

Pivot point 134 of shifting yoke 102 permits such yoke to assume different positions relative the distal end of shaft 26, as shown by dotted line representation 102' of present FIG. 1. Such dotted line position 102' generally represents a relatively low speed output of output shaft 34; hence, the axial position of adjustable locking collar 116 comprises in effect a low speed setting. At the same time, the solid line illustration 102 of present FIG. 1 represents a relatively high speed output for output shaft 34; hence, the axial position of locking adjustable collar 118 represents a high speed stop setting for the speed change mechanism.

It is further understood by those of ordinary skill in the art that such an arrangement advantageously involves placement of the support mount 122 outside of tile loop of drive belt 36 while the axial actuation means, for example, shifting screw 104, is received inside the loop of drive belt 36. Alternate embodiments could reverse such positions relative the loop of drive belt 36, with yoke 102 still pivoted across the distal end of shaft 26.

With more specific reference to shifting yoke means 102 of FIGS. 5 and 6, it may be observed that a generally rigid, elongated member 102 is provided. Such member has a generally pivoted end 128 adapted for the above-referenced pivotable attachment at point 134 to support mount 122. A separate pivoting end 135 is adapted for free engagement with the actuation element, for example, the shifting nut 106. Shifting yoke 102 further includes a central opening 136 between such two ends 128 and 135, for receiving the thrust bearing means 100. Specific engagement surfaces 138 are provided for engaging thrust bearing means 100.

With reference to FIGS. 1 and 7, those of ordinary skill in the art will readily observe that pivoting end 135 of yoke 102 includes a pair of engagement ears 140 which are adapted to be received on either side of predetermined engagement surfaces 142 of shifting nut or actuation element 106. Such features contribute to certain safety advantages, as explained hereinafter.

Because biasing spring 96 (FIG. 8) forces variable speed discs 30 and 32 towards one another, drive belt 36 is biased in a relatively "downward" direction relative to the illustration of present FIG. 1. Such "downward" force is applied also relative discs 22 and 24, the variable pitch sheave surfaces of which tend to force movable constant speed disc 22 in an outboard direction (i.e., to the left in the illustration of present FIG. 1). Accordingly, thrust bearing 100 is biased axially outward into engagement with shifting yoke 102. Contact of surfaces 144 of thrust bearing means 100 with surfaces 138 of yoke 102 causes such yoke 102 to also be biased in an axially outward direction. The net result of such is that end 135 of yoke 102 may be provided in free engagement with the actuation element or shifting nut 106.

In order to effect a speed change, shifting screw 104 may be used so as to drive shifting nut 106 against the projecting ears 140 of yoke 102 (i.e., to the right in the illustration of FIG. 1). As discussed above, such pivoting movement of yoke 102 would tend to increase the output speed of output shaft 34. On the other hand, the speed shifting mechanism may effect a reduction in speed by causing shifting nut or actuation element 106 to be moved axially outward (i.e., towards,the left in present FIG. 1, towards the position of dotted line shifting nut 106'), which would permit yoke 102 to be moved outwardly against shifting nut 106.

Another aspect of such free engagement between yoke 102 and shifting nut 106 is represented in present FIGS. 5 and 7. More specifically, the first arm 86 of support bracket 58 (and including part of projected region 56) includes a generally planar upper travel surface 146 adjacent the axial travel path of actuation element or shifting nut 106. The function of such surface is to limit rotational movement of the actuation element if it seizes up, .i.e., becomes locked to or with shifting screw 104 due to rust, wear, misalignment, etc. In such event, the relatively rigid surface 146 would limit the degree of rotation of nut 106, as represented in present FIG. 5. With such limitation, safety means are provided which prevent any damage to the engagement ears 140 of shifting yoke means 102. As illustrated in such FIG. 5, the travel surface 146 simply prevents a degree of rotation of nut 106 beyond a point which would permit side surfaces 142 thereof to damage engagement ears 140 of yoke 102.

Those of ordinary skill in the art will readily observe that the actuation means or shifting screw 104 may be variously supported with reference to belt drive 20. For example, a portion of support bracket 58 may include an opening 148 therein to permit rotatable support of shifting screw 104. If desired, a replaceable bushing 150 or the like (FIG. 4) may be received through such opening. Similarly, support opening 152 for the opposite end of shifting screw 104 may be made in support backbone 48 (FIG. 1). Alternatively, support bracket 58 may be modified so that a portion of it also supports the entirety of such portion of the speed changing mechanism as discussed above. Regardless of what modifications and variations may be practiced in given embodiments, it is one of the optional features and advantages of the subject that such support features hereof may simultaneously provide support for the outboard end 40 output shaft 34, while supporting at least a part of the speed changing mechanism.

FIG. 1 illustrates removable cover 54 in mated position with reference to opening 50 of housing means 46. In FIG. 2, housing cover 54 is removed, and in FIG. 7 (a partially exploded view) the cover is also removed. Four openings, threaded holes 154, are illustrated as being formed in the face of opening 50 of housing means 46. Corresponding quarter turn screws 156, bolts, removable pins, or other closure means may be utilized to secure housing cover 54 for the remainder of housing means 46. Alternative closure means and alternate number of holes may be practiced. Preferably, quarter turn screws or other elements which are readily closed and opened are to be practiced, depending on the degree of access desired. For example, screw heads or other types of closures with specialized engagement surfaces, i.e., requiring special tools for access, may be utilized if desired.

Those of ordinary skill in the art will readily appreciate the tremendous advantages in maintenance methods which are made possible by the exemplary improved variable speed belt drive described about in detail. The following very briefly describes some aspects of such methodology, mostly with reference to the partially exploded view of FIG. 7. Additional advantages will be perceived by those of ordinary skill in the art based upon the following additional discussion of such improved methodology.

For example, the belt drive of FIGS. 1, 2, and 7 includes alignment means, integrally defined by and associated with the drive housing opening 50, for aligning one of the constant speed discs relative the first shaft 26. More particularly, it may be observed best from FIG. 1, that a straight edge placed across opening edge 50 along imaginary dotted line 158 establishes an intersection point, i.e., an alignment point, with first shaft 26. Such alignment point is in fact the proper location of an outboard edge of inboard disc 24.

At present, assembly personnel or maintenance personnel must make various measurements in an effort to determine the appropriate location of the discs. However, with the present invention, no such measurements need be made. Either when the belt drive is first being assembled, or if the discs are being replaced, the discs are connected to the motor shaft or first shaft 26 such as with an integral key, integral keyway, or other conventional approach. In other words, with this invention disc 24 is pushed onto the motor shaft or input shaft 26 by axially positioning the disc with the intersection of the straight edge laid across and in the place of the imaginary dotted line 158. The opening 50 thereby constitutes alignment means. Once the correct position for disc 24 is established, the correct position for disc 22 is automatically also established in relation thereto, and again without requiring measurement.

The present invention provides similar alignment features with respect to the discs relative output shaft 34. More specifically, it will be understood by those of ordinary skill in the art that support backbone 48 (including projection 56 thereof) and support bracket 58 effectively combine to establish a specific location for shaft 34 relative to housing means 46, relative to output flange 42, and accordingly, relative to reducer 82 or whatever is the load to be driven. A position is also established relative to the other pair of discs 22 and 24. Hence, by use of notches, slots, or the like on output shaft 34 and positioning snap rings thereon, as represented by reference characters 160 of present FIG. 8, the correct position of discs 30 and 32 may likewise be automatically established upon installation of the output shaft in accordance with this invention.

In other words, the position of the fixed disc 30 of the variable speed discs 30 and 32 may be set by the combination of the backbone 48 and the bracket 58 in conjunction with the output shaft snap rings. Preferably, the snap ring locations are used to establish the bearing location on the reducer output flange (see FIG. 8). It will be understood by those of ordinary skill in the art that the biasing spring means 96 and associated telescoping members 162 and 164 are no impediment to establishing the correct axial location of disc 30 relative shaft 34.

Those of ordinary skill in the art will further appreciate that the subject invention, both apparatus and method, includes provision of such an improved apparatus, both in states of partial assembly and partial disassembly thereof. While an inoperative device, or at least a not fully functional device, may temporarily exist, there is significant utility in being able to partially disassemble and/or partially reassemble an improved variable speed belt drive in accordance with the present invention. Purposes such as for performing various maintenance and adjustment operations are well known and understood by those of ordinary skill in the art.

In this instance, a present method making use of such an improved variable speed belt drive may include at least partially assembling various components thereof, such as by mounting a pair of discs 30 and 32 on an output shaft 34, applying bearing means 43 thereto, and supporting such bearing means 43 in means for supporting same, i.e., some selected and/or designated portion of housing means 46. Thereafter, one may removably install the subject bracket means 58 (i.e., the support bracket) with the other bearing means 44 also received therewith, so that the output shaft 34 is straddle supported by such first and second bearing means 43 and 44. Thereafter, one may install the input shaft 26 with the proximal disc 24 of disc pair 22/24 supported thereon. As discussed above, such installation may be accompanied by various alignment procedures in accordance with the present invention for aligning both the proximal constant speed disc as well as the variable speed discs.

Further methodology including further assembling of the belt drive 20 may include installing drive belt 36 entrained about shafts 26 and 34 and in between the disc pair 30/32 on the output shaft 34. Thereafter, the remaining disc 22 may be installed on the input shaft 26, followed by installation of the means for changing of the drive ratio. As will be understood by the above discussion, such installation would basically include the positioning of thrust bearing 100 followed by the placement and positioning of yoke 102 (including replacement of removable pin 120 into the support mount 122 on which yoke 102 is pivoted). Thereafter, housing cover 54 may be replaced, closure means 156 actuated for securing same to housing means 46, and handwheel 108 replaced to the extended portion 110 of shifting screw 104, including use of removable pin 114.

If such an assembled improved variable speed belt drive in accordance with this invention were to be again partially disassembled so as to facilitate maintenance and/or adjustment procedures thereon, one would remove the handwheel or other external actuation or control member, as necessary, and thereafter remove the housing cover and at least partially remove the means for changing the drive ratio (i.e., remove yoke 102 and thrust bearing 100). Thereafter, disc 22 could be readily removed from input shaft 26, and the remaining apparatus would be very widely exposed for maintenance and/or adjustment procedures.

For example, if the maintenance procedures require removal of the drive belt, such may need to be cut away, depending on the degree of any damage or the like. Such is a relatively simple procedure with the subject invention in light of the tremendously exposed nature of the interior 52 of housing means 46 once the nonload bearing housing cover 54 is removed. If bushings within annular opening 60 must be replaced, such is done very simply once disc 22 is removed as described above. Throughout such two primary maintenance operations (maintenance to the drive belt or the disc bushings), support bracket 58 stays entirely in place and intact, as does the support and alignment for output shaft 34. Similarly, at least a portion of the means for changing the drive ratio continue to be in place, such as including shifting screw 104, shifting nut 106, extended element 110, and speed limit setting collars 116 and 118.

Those of ordinary skill in the art will immediately appreciate that additional specific steps would be practiced during maintenance and adjustment procedures, for example, stopping the unit, shutting off and locking out power thereto, etc., for the sake of safety and as a practical matter. The following more detailed description is directed to one of ordinary skill in the art with respect to various maintenance procedures which may be encountered from time to time.

For example, the following procedure would be followed in order to remove a belt from a fully assembled unit as represented in present FIG. 1. First, shift to a high speed position (solid line representation of yoke 102), stop unit, and lock-out main drive motor 28. Next, remove pin 114 and handwheel 108. Operate closure means 156 so as to remove cover 54. Turn shifting screw 104 clockwise several turns to remove tension from shifting yoke 102. Pull pin 120 and remove shifting yoke 102. Slide thrust, bearing 100 and disc 22 off from shaft 26. Now, the maintenance personnel are ready to remove belt 36 in the direction shown generally towards the solid line illustration thereof in present FIG. 7.

In order to install a belt, first the belt is positioned as illustrated in dotted line 36' in FIG. 7. Then, disc 22 and thrust bearing 100 are reinstalled, and shifting screw 104 is reverse turned. The thrust bearing housing should be rotated so that the shifting yoke opening passes over and engages surface 144. The wide, spaced ears 140 should be placed over and into position onto nut 106 adjacent side surfaces 142 thereof, and with yoke 102 turned in the direction as illustrated in present FIGS. 1 and 7. Reinstall detent pin 120. Remove slack between the shifting nut and the thrust bearing housing and shifting yoke by turning shifting screw 104 gently counterclockwise. Reinstall cover 54 enclosure means 156, handwheel 108 and detent pin 114.

In order to replace the constant speed disc (discs 22 and 24) bushings, access to disc 22 is first gained as discussed above with respect to belt removal. Thereafter, the key from the inside of sliding constant disc 22 is removed, which permits bushings within disc bore 60 to be removed. Such bore should be cleaned before the new bushings are inserted, one from each end until seated in grooves in the disc bore (not shown). The key should be reinserted into the internal keyway, the bushings greased and the disc returned to shaft 26.

As discussed above with respect to speed settings, adjustable collar 116 should be axially positioned as desired (such as through experimentation) in order to establish a predetermined desired low speed setting, while adjustable collar 118 should be similarly set in order to establish a desired high speed limit. Those of ordinary skill in the art will appreciate that the drive should be fully stopped and safeguarded before any wrench or other object is inserted into the case or housing. In general, where a set screw type of arrangement is practiced, a hex drive or similar may be used to release the collar, with the collar being rotated into a further desired location, and then the hex drive used to reestablish the fixed position of the collar, as desired.

In order to completely replace the constant speed discs or the motor 28, first the drive belt is removed as discussed above. Thereafter, the constant speed discs themselves are removable once the speed changing mechanism is at least partially removed, i.e., once the shifting yoke 102 and thrust bearing 100 are removed. Thereafter, specific motor mounting directions would be accompanied by specific motors and vary therewith.

In order to replace the variable speed discs or the bushings thereof, first the drive belt is removed as discussed above. Thereafter, bolt means 66 or the like are operated for removal or dismounting of support bracket 58. Of course, tachometer means 72 should be first removed, if present. Once the entire bracket and shifting screw assembly is removed, the second bearing means 44 remains on output shaft 34. Thereafter, a bearing puller may be used to remove bearing means 44, with care being taken that no radial load is applied to the shaft 34, in order to prevent damage to the pinion of the reducer and/or the first bearing means 43.

Subsequent thereto, the fixed variable speed disc 30 should be compressed towards the backbone (i.e., to the right in FIG. 1), and the snap ring removed near the end 40 of variable speed shaft 34. With care, the fixed disc would be removed, ensuring that the spring cartridge 98 is kept intact. Thereafter, the sliding or movable variable speed disc 32 may be removed, as well as the spring cartridge assembly 98. At such time, the spring cartridge may be inspected and replaced if necessary.

In order to replace the bushings of the sliding variable speed disc 32, the old bushings should be compressed and rolled so as to be removed from the disc bore. Once the disc bore is cleaned, the new bushings may be rolled and compressed and thereafter inserted into the disc bore, one from each end with the flange end being done first. The flanges should be seated in the grooves in the disc bore. The bushings should be greased as well as the cavity between the bushings. The spring can cover should be placed back over the sliding variable disc hub and the sliding disc placed onto the variable speed shaft 34. Thereafter, the fixed disc 30 may be replaced onto the shaft 34, the disc 30 compressed towards reducer 82, and the snap ring reinstalled on shaft 34. New bearings 44 are replaced onto shaft 34.

Thereafter, the bearing/shifter support bracket 58 should be replaced, starting with introduction of the bearing means 44 into the bearing bore 62. Once bracket 58 is properly positioned, securement means 66 should be operated for securing bracket 58 to support backbone 48. Drive belt 36 is reinstalled thereafter, as outlined above.

Those of ordinary skill in the art will appreciate that various modifications and variations may be practiced with reference to the above-described exemplary embodiments.

Present FIG. 8 is intended as an example of one such alternative embodiment. FIG. 8 illustrates an enlarged and partial view of a cross section of a second exemplary embodiment of an improved variable speed belt drive in accordance with the subject invention, primarily focused on the area of the output shaft 34 and support bracket thereof and associated features. Repeat use of reference characters from the first embodiment of FIG. 1 is intended as representing same or analogous features thereof. New reference characters are applied to further embodiments of the invention.

In addition to showing certain alternate features, as discussed below, FIG. 8 shows some additional detail not contained in exemplary FIG. 1. Refer for example to the snap ring 160 and telescoped members 162 and 164 in relation to the positioning and operation of discs 30 and 32 on variable speed shaft 34.

Aside from the precise shape of the output flange 42, the housing cover 54, and the extended area 74 of such housing cover, the primary differences of the FIG. 8 verses the FIG. 1 embodiment relate to the support backbone and support bracket features thereof. Specifically, instead of the support backbone 48 and support bracket 58 of FIG. 1, the exemplary belt drive embodiment of FIG. 8 in accordance with the subject invention includes a support bracket 168 in combination with an extended or projected region 170 of support backbone 172. As illustrated, such members join at edge 174, preferably through use of removable securement means such as bolt means 176. As also represented by FIG. 8, such arrangement continues to provide support for second bearings means 44, which in turn rotatably receives the outboard end of variable speed shaft 34. It also continues to provide support for at least part of the speed shifting mechanism (particularly shifting screw 104), as in other embodiments.

Figure 9:
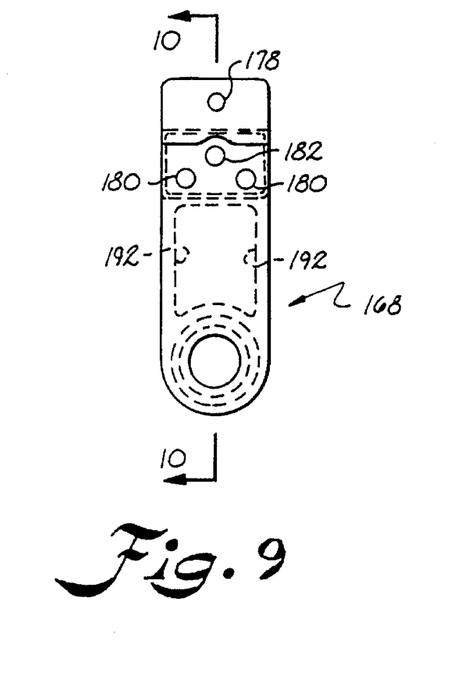
FIG. 9 is an end elevational view, with partial representation in dotted line of certain features, of an alternate exemplary embodiment of a support bracket in accordance with the present invention, and as represented in the exemplary embodiment of present FIG. 8.
Figure 10:
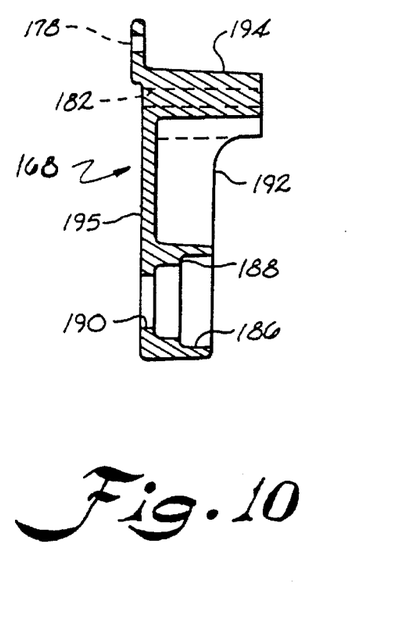
FIG. 10 is a cross sectional view of the FIG. 9 support bracket embodiment, taken along the section line 10—10 in such FIG. 9.

FIGS. 9 and 10 comprise an end elevational view and cross sectional view, respectively, of support bracket 168. Such greater detail particularly illustrates an upper opening 178 for receipt of the extended portion 110 of shifting screw or axial actuation means 104. In this embodiment, only two openings 180 are required for a corresponding pair of bolt means 176. An elongated conduit or channel 182 may again be provided for receipt of tachometer signal wires 184 or other electrical wires.

At the lower end of support bracket 168, a first annular opening 186 is provided for receipt of such second bearing means 44, resting against an annular shoulder 188. A further annular opening 190 is provided through which tachometer means 72 may be operatively engaged with variable speed shaft 34.

Due to the overall size differential between support brackets 168 and 58, relatively larger flange members 192 are provided with support bracket 168 for joining the first or upper support arm 194 with the lower member 195 thereof. It is part of the broader aspects of the present invention, as referenced above, that the dividing line 174 may be moved. As is readily observed, the projected region 170 of the embodiment of present FIG. 8 extends to a greater degree than the region 56 of the FIG. 1 embodiment. As will be appreciated by those of ordinary skill in the art, such projected region may be virtually eliminated, at least with respect to the support bracket, as is the case in the further alternative embodiment of present FIGS. 11 through 13.

Figure 11:
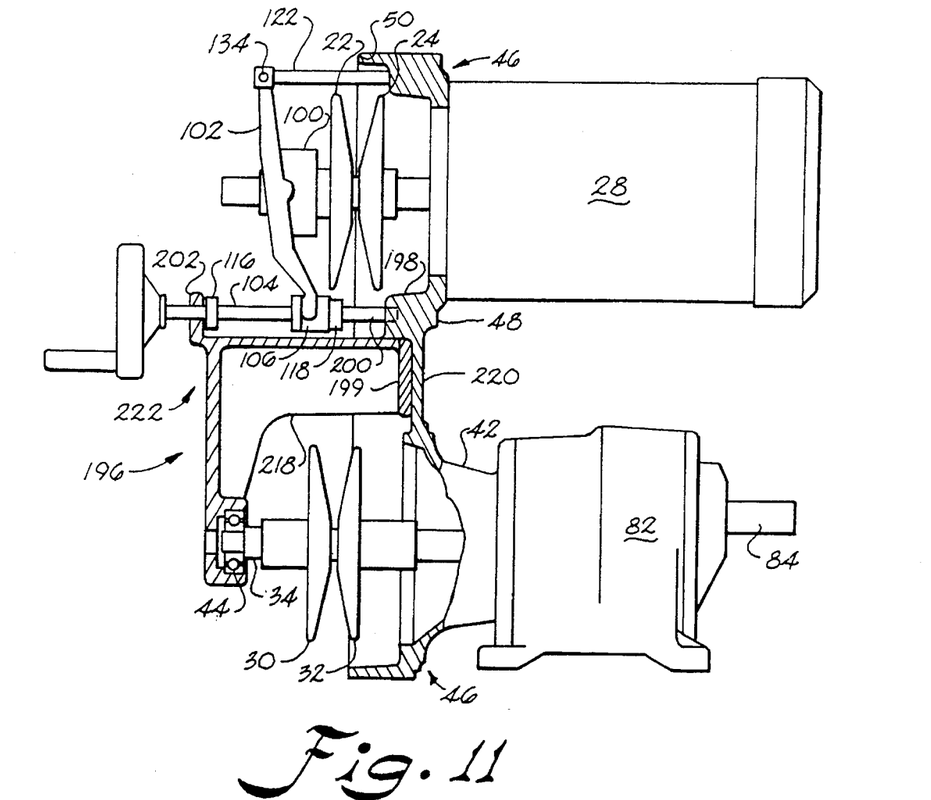
FIG. 11 is a view similar to that of present FIG. 1, but with the housing cover thereof removed, and with illustration of various further alternative support backbone/support bracket features of the subject invention.
Figure 12:
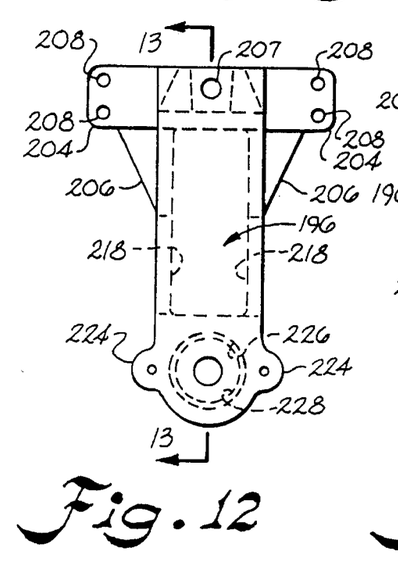
FIG. 12 is an end elevational view, with partial representation in dotted line of certain features, of a still further alternate exemplary embodiment of a support bracket in accordance with the present invention, and as represented in the exemplary embodiment of present FIG. 11.
Figure 13:
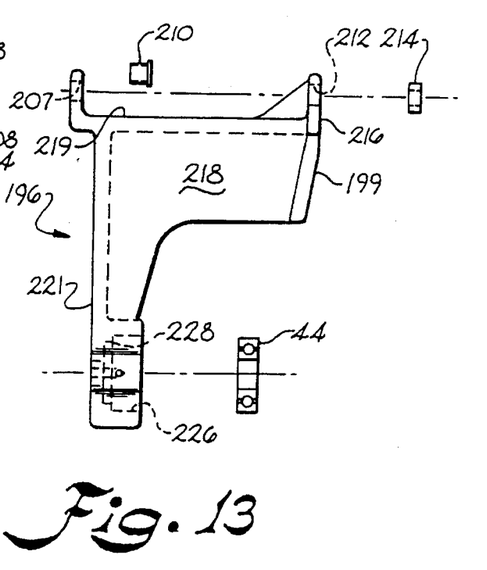
FIG. 13 is a cross sectional view of the FIG. 12 support bracket embodiment, taken along the section line 13—13 in such FIG. 12.

With reference to present FIG. 11, such figure provides a view similar to that of present FIG. 1, but with the housing cover thereof removed, and with illustration of various further alternative support bracket and support backbone features in accordance with the subject invention. More particularly, an alternate embodiment of a support bracket 196 is illustrated in FIG. 11 in combination with other features of the present invention. FIGS. 12 and 13 illustrate such alternate support bracket 196 in end elevational and cross sectional views, respectively. Repeat use of reference characters in FIGS. 11 through 13 is intended to represent same or analogous features or elements thereof with respect to other embodiments, as elsewhere described.

As alluded to above, the projected or enlarged region 198 of support backbone 48 is greatly reduced in the FIG. 11 embodiment in comparison with the embodiments of FIGS. 1 and 8. The inboard end or side 199 of support bracket 196 is received virtually directly against the rearward wall of support backbone 48. An end 200 of shifting screw 104 is received in area 198 of support backbone 48. Alternatives may be practiced, as discussed below. An opposite end 202 is received in a portion of support bracket 196, as in other embodiments.

Support bracket 196 differs, in part, from the other exemplary support brackets by inclusion of expanded wings or flanges 204 and interconnecting flanges 206. The upper portion of support bracket 196 defines an opening therein 207 for receipt of shifting screw 104 in region 202 thereof, as discussed above. At the same time, a plurality of openings 208 may be defined in extended flanges or wings 204 for receiving bolt means for the removable securement of support bracket 196 to support backbone 48, similar to embodiments discussed above.

As an alternative to receipt of end 200 of shifting screw 104 in backbone area 198, or in addition thereto, the inboard side 199 of support bracket 196 may be further outfitted for receipt of shifting screw 104. More particularly, a bushing 210 may be received within the annular opening 207 while an annular opening 212 is formed rearwardly thereof and receives therein bearing means 214 within which the end 200 of shifting screw 104 is supported. Such annular opening 212 may be formed in an inboard, top area 216 of support bracket 196.

As illustrated, such top area 216 and inboard side 199 may be supported by interconnecting flange regions 218, which generally join or interconnect a first support arm area 219 with a second support arm area 221 of the exemplary support bracket 196. With such embodiment of support bracket 196, the support bracket itself extends generally from one side 220 of housing 46 to the opposite side 222 thereof (see FIG. 11).

Still further extended flange areas 224 may be provided for the further securement of support bracket 196 to housing means 46 of FIG. 11. At such end of support bracket 196, an annular opening 226 may be provided for receipt of second bearing means 44, received against an annular shoulder 228 as further defined and illustrated.

Those of ordinary skill in the art will appreciate from the foregoing modifications and variations represented by contrast and comparison of support bracket embodiments 58, 168, and 196 that further modifications and variations may be practiced thereto, all of which come within the spirit and scope of the present invention so long as the broader aspects thereof are maintained. Those of ordinary skill in the art will appreciate further modifications and variations which may be practiced in keeping with the broader aspects of other features, elements, and steps of this invention.

With the present invention, the advantageous combination of support backbone and support bracket features provides a number of advantages in embodiments where such are used, meeting various of the above-outlined objects. For example, advantages are achieved by combining various structural functions into a single element or combined such elements. For example, the support backbone features of this invention, associated with the housing means itself, contribute to support of the variable bearing shaft 34 and the speed change mechanism involving shifting screw 104. Different motor mount faces may be provided while at the same time an integral reducer mounting or other integral output mounts may be provided. As illustrated, a tachometer pick-up channel or conduit may be built in, just as automatic alignment of the fixed disc position for the constant speed disc 24 and other automatic alignment features are provided.

Still further, a tremendous advantage is provided with maintenance times savings, even up to 75 to 95 percent savings of time. Much of such savings flows from the fact that the rigid support results in mechanical advantage for the separation of the variable discs during belt installation, and at the same time the bearing alignment and output shaft/gear reducer input pinion connection is fully maintained during all belt changing operations. Such are further advantages in conjunction with the fact that the housing cover is not used to provide structural strength or support, or shaft alignment.

The support bracket contributes to the foregoing advantages, as well as locating and retaining the shifting assembly and actuation control mechanism therefor. Based thereon, all internal components of the speed changing mechanism may be completely replaced even while the complete drive remains installed, either with a constant speed motor input or a gear speed reducer output or other rotating load to be driven.

Since there is such little structural disassembly in maintenance of the foregoing improved variable speed belt drive, time savings as reported above in the 75 to 95 percent range are quite realistic. Furthermore, either a single tool, or possibly no tools at all, would be required for some routine maintenance procedures.

Even with the foregoing advantages, further modifications and variations may be practiced. For example, the control mechanism for speed changing may be selected and varied by the user. For example, the same basic shifting screw mechanism and the like may be used with manual, electric, or pneumatic control. It is even adaptable to direct linear pneumatic control. Likewise, the limit switches for the speed range (i.e., drive ratio range settings) are functional with any of such manual, electric, or pneumatic control systems.

It should be further understood by those of ordinary skill in the art that the foregoing presently preferred embodiments (both apparatus and method) are exemplary only, and that the attendant description thereof is likewise by way of words of example rather than words of limitation, and their use do not preclude inclusion of such modifications, variations, and/or additions to the present invention as would be readily apparent to those of ordinary skill in the art, the scope of the present invention being set forth in the appended claims.

What is claimed is:

1. A method of assembling a maintenance friendly belt drive, said assembly method comprising;

providing a drive housing with a relatively large interior access opening thereto, said drive housing having a support backbone at a generally central location in said interior access opening, a first shaft supported on its proximal end by said housing on one side of said backbone and adapted for receiving a constant speed drive input, and a second shaft supported on its proximal end by said housing on the other side of said backbone and adapted for providing a variable speed drive output, said second shaft having a pair of variable speed discs mounted thereon;

securing a support bracket to said support backbone, so that such bracket engages and rotatably supports a distal end of said second shaft;

providing a pair of constant speed discs, and mounting a first one of said discs on said first shaft;

installing a drive belt about said second shaft entrained in between said variable speed discs and with the loop of said drive belt placed about said first shaft;

mounting a second one of said constant speed discs onto said first shaft;

installing speed change means for adjusting the drive ratio between the respective pairs of discs so as to vary the drive power transmitted between the shafts via said drive belt, including mounting a thrust bearing over the distal end of said first shaft, with such thrust bearing supported for axial movement thereof along said first shaft by operation of an actuation mechanism associated therewith; and securing a housing cover to said drive housing opening; wherein said assembly steps may be selectively reversed for maintenance and/or adjustment to said drive belt and other components within said drive housing;

wherein said mounting of said first one of said constant speed discs includes aligning such disc on said first shaft with an alignment edge defined by said drive housing opening.

2. A method of assembling a maintenance friendly belt drive, said assembly method comprising;

providing a drive housing with a relatively large interior access opening thereto, said drive housing having a support backbone at a generally central location in said interior access opening, a first shaft supported on its proximal end by said housing on one side of said backbone and adapted for receiving a constant speed drive input, and a second shaft supported on its proximal end by said housing on the other side of said backbone and adapted for providing a variable speed drive output, said second shaft having a pair of variable speed discs mounted thereon;

securing a support bracket to said support backbone, so that such bracket engages and rotatably supports a distal end of said second shaft;

providing a pair of constant speed discs, and mounting a first one of said discs on said first shaft;

installing a drive belt about said second shaft entrained in between said variable speed discs and with the loop of said drive belt placed about said first shaft;

mounting a second one of said constant speed discs onto said first shaft;

installing speed change means for adjusting the drive ratio between the respective pairs of discs so as to vary the drive power transmitted between the shafts via said drive belt, including mounting a thrust bearing over the distal end of said first shaft, with such thrust bearing supported for axial movement thereof along said first shaft by operation of an actuation mechanism associated therewith; and securing a housing cover to said drive housing opening; wherein said assembly steps may be selectively reversed for maintenance and/or adjustment to said drive belt and other components within said drive housing;

further including providing at least one snap ring along said second shaft at a location outboard of said variable speed discs so that installation of said variable speed discs on said second shaft inboard of said at least one snap ring results in proper alignment of said variable speed discs relative to said drive housing upon installation of said support bracket.

3. A method of assembling a maintenance friendly belt drive, said assembly method comprising;

providing a drive housing with a relatively large interior access opening thereto, said drive housing having a support backbone at a generally central location in said interior access opening, a first shaft supported on its proximal end by said housing on one side of said backbone and adapted for receiving a constant speed drive input, and a second shaft supported on its proximal end by said housing on the other side of said backbone and adapted for providing a variable speed drive output, said second shaft having a pair of variable speed discs mounted thereon;

securing a support bracket to said support backbone, so that such bracket engages and rotatably supports a distal end of said second shaft;

providing a pair of constant speed discs, and mounting a first one of said discs on said first shaft;

installing a drive belt about said second shaft entrained in between said variable speed discs and with the loop of said drive belt placed about said first shaft;

mounting a second one of said constant speed discs onto said first shaft;

installing speed change means for adjusting the drive ratio between the respective pairs of discs so as to vary the drive power transmitted between the shafts via said drive belt, including mounting a thrust bearing over the distal end of said first shaft, with such thrust bearing supported for axial movement thereof along said first shaft by operation of an actuation mechanism associated therewith; and securing a housing cover to said drive housing opening; wherein said assembly steps may be selectively reversed for maintenance and/or adjustment to said drive belt and other components within said drive housing;

wherein said actuation mechanism includes a pivot mounted shifting yoke, and further includes a shifting screw supported in said support bracket and an associated shifting nut for engagement with said shifting yoke, said shifting screw extending through said housing cover when seated so as to facilitate actuation of said control mechanism for such shifting yoke;

further including installing a pair of adjustable collars on said shifting screw on either axial side of said shifting nut, and securing said collars in selected axial positions along said shifting screw so as to establish respective upper and lower limits to operation of said speed change means.

4. A method of assembling an enclosable variable speed belt drive, said method including providing belt drive components comprising:

housing means including an interior chamber for receipt of internal components; a support backbone located in said interior chamber for support of at least one component received in said interior chamber; an opening defined by said housing means for entrance to said interior chamber thereof; and a removable, nonload bearing housing cover generally mated with said opening of said housing means, for providing relatively exposed access to said interior chamber through said opening whenever said cover is removed therefrom;

closure means for removably securing said housing cover to said housing means;

respective pairs of discs comprising variable pitch sheaves and mountable on respective input and output shafts, said shafts being received in said housing means interior chamber;

a drive belt to be entrained about said shafts and in between said disc pairs for transmitting drive power between said shafts;

means for changing the drive ratio between said shafts by adjusting the drive relationship between said discs and said belt;

a pair of bearing means for supporting said output shaft on respective sides of said disc pair associated therewith;

means for supporting one of said output shaft bearing means generally on one side of said housing means; and bracket means, to be attached during operation of the belt drive to said support backbone and through the loop of said drive belt, for supporting the other of said output shaft bearing means generally on a side of said housing means opposite to said one side thereof, so that said output shaft may be straddle supported without requiring load bearing support from said housing cover, thereby improving access to said interior chamber, said drive belt, said input shaft, and said disc pair associated with said input shaft, for maintenance procedures upon removal of said cover;

said method further including at least partially assembling said components by mounting a pair of said discs on said output shaft, applying one of said bearing means to said output shaft, and supporting said one bearing means in said means for supporting;

removably attaching said bracket means with the other of said bearing means to said support backbone so that said output shaft is straddle supported; and installing said input shaft with a first one of said discs supported thereon;

installing said drive belt entrained about said shafts and in between said disc pair on said output shaft; and mounting the remaining disc on said input shaft;

wherein said step of mounting said discs on said output shaft includes axially aligning such discs on said output shaft with angular slots and snap rings thereon so that installation of said output shaft in said bracket means properly aligns said discs on said output shaft with the remainder of said belt drive.

5. A method of assembling an enclosable variable speed belt drive, said method including providing belt drive components comprising:

housing means including an interior chamber for receipt of internal components; a support backbone located in said interior chamber for support of at least one component received in said interior chamber; an opening defined by said housing means for entrance to said interior chamber thereof; and a removable, nonload bearing housing cover generally mated with said opening of said housing means, for providing relatively exposed access to said interior chamber through said opening whenever said cover is removed therefrom;

closure means for removably securing said housing cover to said housing means;

respective pairs of discs comprising variable pitch sheaves and mountable on respective input and output shafts, said shafts being received in said housing means interior chamber;

a drive belt to be entrained about said shafts and in between said disc pairs for transmitting drive power between said shafts;

means for changing the drive ratio between said shafts by adjusting the drive relationship between said discs and said belt;

a pair of bearing means for supporting said output shaft on respective sides of said disc pair associated therewith;

means for supporting one of said output shaft bearing means generally on one side of said housing means; and bracket means, to be attached during operation of the belt drive to said support backbone and through the loop of said drive belt, for supporting the other of said output shaft bearing means generally on a side of said housing means opposite to said one side thereof, so that said output shaft may be straddle supported without requiring load bearing support from said housing cover, thereby improving access to said interior chamber, said drive belt, said input shaft, and said disc pair associated with said input shaft, for maintenance procedures upon removal of said cover;

said method further including at least partially assembling said components by mounting a pair of said discs on said output shaft, applying one of said bearing means to said output shaft, and supporting said one bearing means in said means for supporting;

removably attaching said bracket means with the other of said bearing means to said support backbone so that said output shaft is straddle supported; and installing said input shaft with a first one of said discs supported thereon;

installing said drive belt entrained about said shafts and in between said disc pair on said output shaft; and mounting the remaining disc on said input shaft;

wherein said input shaft installing includes properly aligning said proximal disc thereon with the remainder of said belt drive by axially situating such proximal disc on said input shaft in alignment with an alignment edge formed by said housing means opening with said cover removed therefrom.

6. A method of assembling an enclosable variable speed belt drive, said method including providing belt drive components comprising:

housing means including an interior chamber for receipt of internal components; a support backbone located in said interior chamber for support of at least one component received in said interior chamber; an opening defined by said housing means for entrance to said interior chamber thereof; and a removable, nonload bearing housing cover generally mated with said opening of said housing means, for providing relatively exposed access to said interior chamber through said opening whenever said cover is removed therefrom;

closure means for removably securing said housing cover to said housing means;

respective pairs of discs comprising variable pitch sheaves and mountable on respective input and output shafts, said shafts being received in said housing means interior chamber;

a drive belt to be entrained about said shafts and in between said disc pairs for transmitting drive power between said shafts;

means for changing the drive ratio between said shafts by adjusting the drive relationship between said discs and said belt;

a pair of bearing means for supporting said output shaft on respective sides of said disc pair associated therewith;

means for supporting one of said output shaft bearing means generally on one side of said housing means; and bracket means, to be attached during operation of the belt drive to said support backbone and through the loop of said drive belt, for supporting the other of said output shaft bearing means generally on a side of said housing means opposite to said one side thereof, so that said output shaft may be straddle supported without requiring load bearing support from said housing cover, thereby improving access to said interior chamber, said drive belt, said input shaft, and said disc pair associated with said input shaft, for maintenance procedures upon removal of said cover;

said method further including at least partially assembling said components by mounting a pair of said discs on said output shaft, applying one of said bearing means to said output shaft, and supporting said one bearing means in said means for supporting;

removably attaching said bracket means with the other of said bearing means to said support backbone so that said output shaft is straddle supported; and installing said input shaft with a first one of said discs supported thereon;

installing said drive belt entrained about said shafts and in between said disc pair on said output shaft; and mounting the remaining disc on said input shaft;

said method further including further assembling said belt drive, including:

installing said means for changing the drive ratio; and removably securing said housing cover to said housing means;

said method further including subsequently partially disassembling said belt drive to facilitate maintenance and adjustment procedures thereon, including:

removing said housing cover;

at least partially removing said means for changing the drive ratio; and removing said remaining disc from said input shaft;

wherein said installing said means for changing the drive ratio includes:

rotatably supporting a shifting screw at least partially supported by said bracket means, with a shifting nut received on said screw for axial movement therealong as said screw is rotated;

mounting a thrust bearing on said input shaft on a distal side of said input shaft relative said discs thereon; and pivotably and removably mounting a shifting yoke for engagement with said thrust bearing and said shifting nut so that axial movement of said shifting nut pivots said shifting yoke for axially shifting said thrust bearing.

7. A method as in claim 6, wherein said partially removing said means for changing the drive ratio includes removing said shifting yoke and removing said thrust bearing so as to permit removal of said distal disc on said input shaft and removal of said drive belt.

* * * * *